United States Patent
Gibson et al.

(10) Patent No.: US 8,216,112 B2
(45) Date of Patent: Jul. 10, 2012

(54) METHODS AND SYSTEMS FOR ASSISTED DIRECT START CONTROL

(75) Inventors: Alex O'Connor Gibson, Ann Arbor, MI (US); Gregory Michael Pietron, Canton, MI (US); Seung-Hoon Lee, Northville, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 468 days.

(21) Appl. No.: 12/541,023

(22) Filed: Aug. 13, 2009

(65) Prior Publication Data

US 2011/0039657 A1 Feb. 17, 2011

(51) Int. Cl.
*F16H 61/26* (2006.01)
*F16H 31/00* (2006.01)
(52) U.S. Cl. .......................... 477/156; 475/137
(58) Field of Classification Search ............ 477/156, 477/158; 74/467; 475/127, 136, 137; 184/6.12, 184/6.22

See application file for complete search history.

(56) References Cited

U.S. PATENT DOCUMENTS

| 6,460,500 | B1 | 10/2002 | Ooyama et al. |
| 6,647,938 | B2 | 11/2003 | Gaessler et al. |
| 6,736,099 | B2 | 5/2004 | Mori et al. |
| 7,341,035 | B2 | 3/2008 | Kassner et al. |
| 7,357,213 | B2 | 4/2008 | Ji |
| 2002/0166530 | A1* | 11/2002 | Tachikawa et al. ......... 123/179.3 |
| 2007/0227801 | A1* | 10/2007 | Loeffler ....................... 180/305 |
| 2010/0018808 | A1* | 1/2010 | Gloge ........................ 184/6.12 |
| 2010/0236231 | A1* | 9/2010 | Miyabe et al. ................. 60/413 |
| 2010/0311538 | A1* | 12/2010 | Miyabe et al. ..................... 477/2 |

FOREIGN PATENT DOCUMENTS

JP 2007239584 9/2007

* cited by examiner

*Primary Examiner* — Roger Pang
(74) *Attorney, Agent, or Firm* — Allan J. Lippa; Alleman Hall McCoy Russell & Tuttle LLP (57) ABSTRACT

Systems and methods are provided for controlling a vehicle system including an engine that is selectively shut-down during engine idle-stop conditions, the system further including a hydraulic circuit comprising a hydraulically actuated transmission component, an accumulator, and an auxiliary transmission fluid pump. One example method comprises, during a first idle-stop engine shut-down condition, where the accumulator pressure is above a threshold, delivering pressurized transmission fluid to the hydraulic circuit from the accumulator, while disabling the auxiliary pump. The method further comprises, during a second idle-stop engine shut-down condition, where the accumulator pressure is below the threshold, operating the auxiliary pump and delivering at least some pressurized transmission fluid to the hydraulic circuit from the operating pump without travelling through the accumulator.

20 Claims, 7 Drawing Sheets

METHODS AND SYSTEMS FOR ASSISTED DIRECT START CONTROL

FIELD

The present application relates to methods and systems for controlling an engine shut-down and a subsequent engine restart.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like.

Engines may be restarted from the idle-stop condition automatically, without receiving an operator input, for example, in response to engine operating parameters falling outside a desired operating range. Alternatively, engines may be restarted from the idle-stop condition in response to a vehicle restart and/or launch request from the operator. Following an engine idle-stop, pressure may be maintained in the hydraulic line to enable transmission and driveline functionality and to reduce the engine restart time.

One example of maintaining hydraulic line pressure is illustrated by Ji in U.S. Pat. No. 7,357,213 B2. Therein, when an idle-stop condition is satisfied, an auxiliary electric oil pump is operated to supply hydraulic oil to the transmission, maintain the hydraulic pressure in the transmission at a predetermined pressure, and thereby maintain the transmission in gear. Another example of maintaining hydraulic line pressure is illustrated by Mori et al. in U.S. Pat. No. 6,736,099. Therein, the hydraulic pressure in the transmission is provided by an accumulator which is discharged at engine restart.

However, the inventors have recognized several potential issues with such systems. As one example, the system of Ji operates the electric pump uninterruptedly when the engine is stopped to maintain the transmission fluid pressure and enable a rapid vehicle launch. As such, the continuous operation of the electric pump may degrade fuel savings and accelerate pump wear-and-tear. As another example, the hydraulic circuit includes flow through components not immediately required for the engine restart, such as an oil cooling circuit. Consequently, the electric pump has to provide flow through these additional components and compensate for leakage (for example, from spool valves), thereby further degrading fuel savings.

As yet another example, following discharge, the system of Mori et al. recharges the accumulator using the electric pump, while preventing flow of transmission fluid from the pump into the remaining components of the hydraulic circuit. As such, this may substantially increase the time required to recharge the accumulator and launch the vehicle. Furthermore, this may limit the ability of the system to support successive restart events, such as multiple shut-down and restart events, as may be required during creep. In either system, the quality of the restart operation may be substantially degraded.

Thus in one example, some of the above issues may be addressed by a method of controlling a vehicle system including an engine that is selectively shut-down during engine idle-stop conditions, the system further including a hydraulic circuit comprising a hydraulically actuated transmission component, an accumulator, and an auxiliary transmission fluid pump. In one example embodiment, the method comprises, during a first idle-stop engine shut-down condition, where the accumulator pressure is above a threshold pressure, delivering pressurized transmission fluid to the hydraulic circuit from the accumulator, while disabling the auxiliary pump. The method further comprises, during a second idle-stop engine shut-down condition, where the accumulator pressure is below the threshold pressure, operating the auxiliary pump and delivering at least some pressurized transmission fluid to the hydraulic circuit from the operating pump without travelling through the accumulator.

In one example, the hydraulic circuit in a vehicle transmission may include an electrically-operated auxiliary pump, an accumulator, a hydraulically actuated transmission component, and a secondary component. The secondary component may be a component not directly involved in engine restart, such as an oil cooler. Herein, a pressure feedback-based control system may adjust and maintain pressure in the hydraulic circuit using either the auxiliary pump or the accumulator. Specifically, during an engine shut-down, operation of the auxiliary pump may be adjusted responsive to the accumulator pressure, for example as estimated by a pressure sensor. In one example, during a first idle-stop engine shut-down condition, where the accumulator pressure is below a threshold pressure, the auxiliary pump may be operated to deliver at least some pressurized transmission fluid to the hydraulic circuit without travelling through the accumulator. In another example, during a second idle-stop engine shut-down condition, where the accumulator pressure is above the threshold, operation of the auxiliary pump may be discontinued and only the accumulator may be used to deliver pressurized transmission fluid to the transmission hydraulic circuit. Accordingly, the frequency with which the auxiliary pump is operated may be substantially reduced. By reducing the operation time of the auxiliary electric pump, substantial energy and fuel savings may be achieved while also reducing component damage (to the pump and motor) due to prolonged pump use.

Additionally, during the first or second engine idle-stop engine shut-down condition, flow of transmission fluid through the secondary component (that is, a vehicle component not immediately involved in engine restart) may be stopped, for example using one or more flow control valves. These secondary components may include, for example, the oil cooler. By stopping the flow of transmission fluid to components not immediately involved in engine restart procedures, sections of the hydraulic circuit requiring flow and pressure maintenance may be reduced, thereby reducing the energy demands on the accumulator and/or electric pump. In doing so, additional fuel economy benefits may be achieved without adversely affecting engine restart times and without degrading engine restart quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
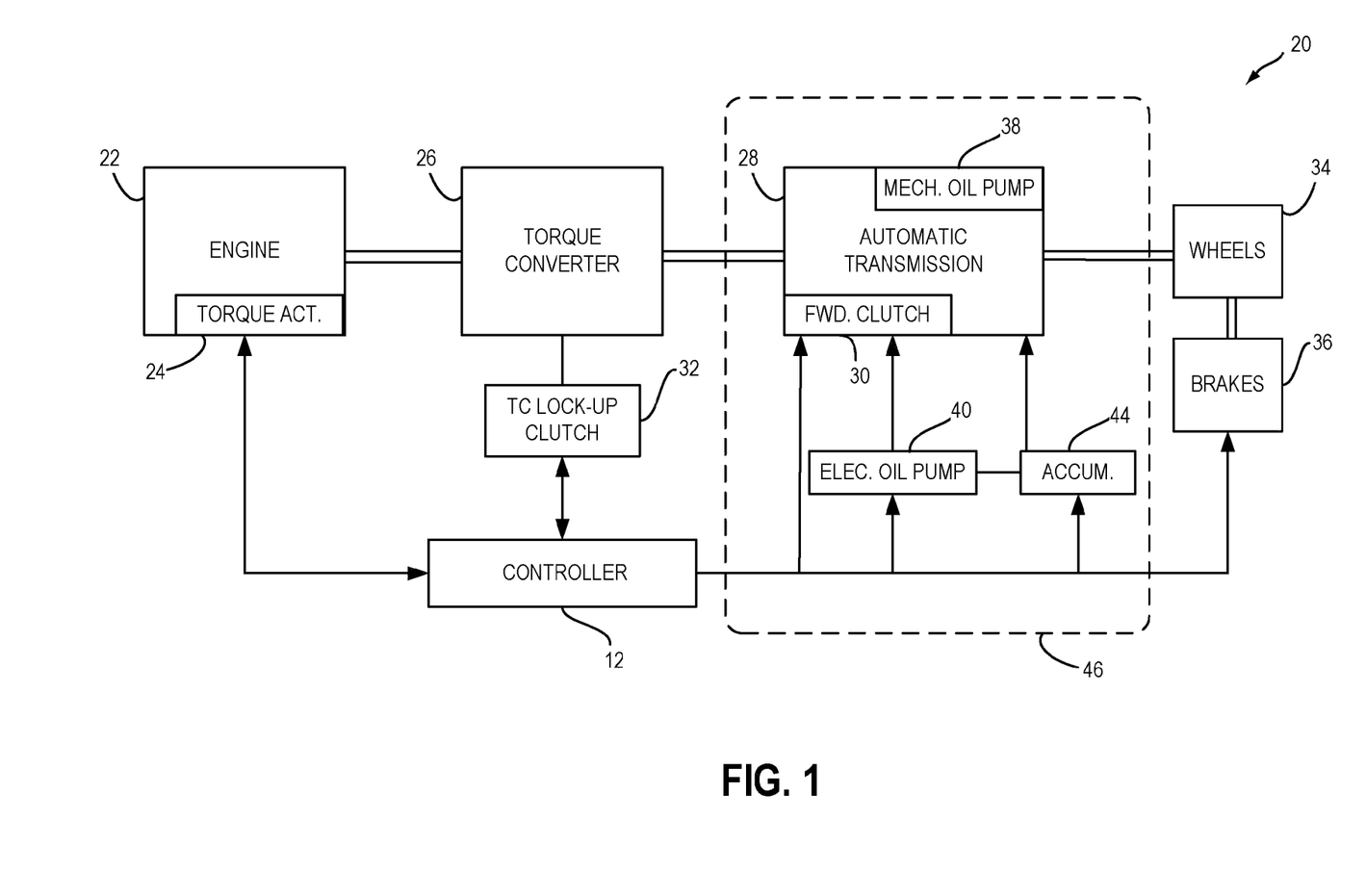
FIG. 1 shows an example vehicle system layout, including details of a vehicle drive-train.
Figure 2:
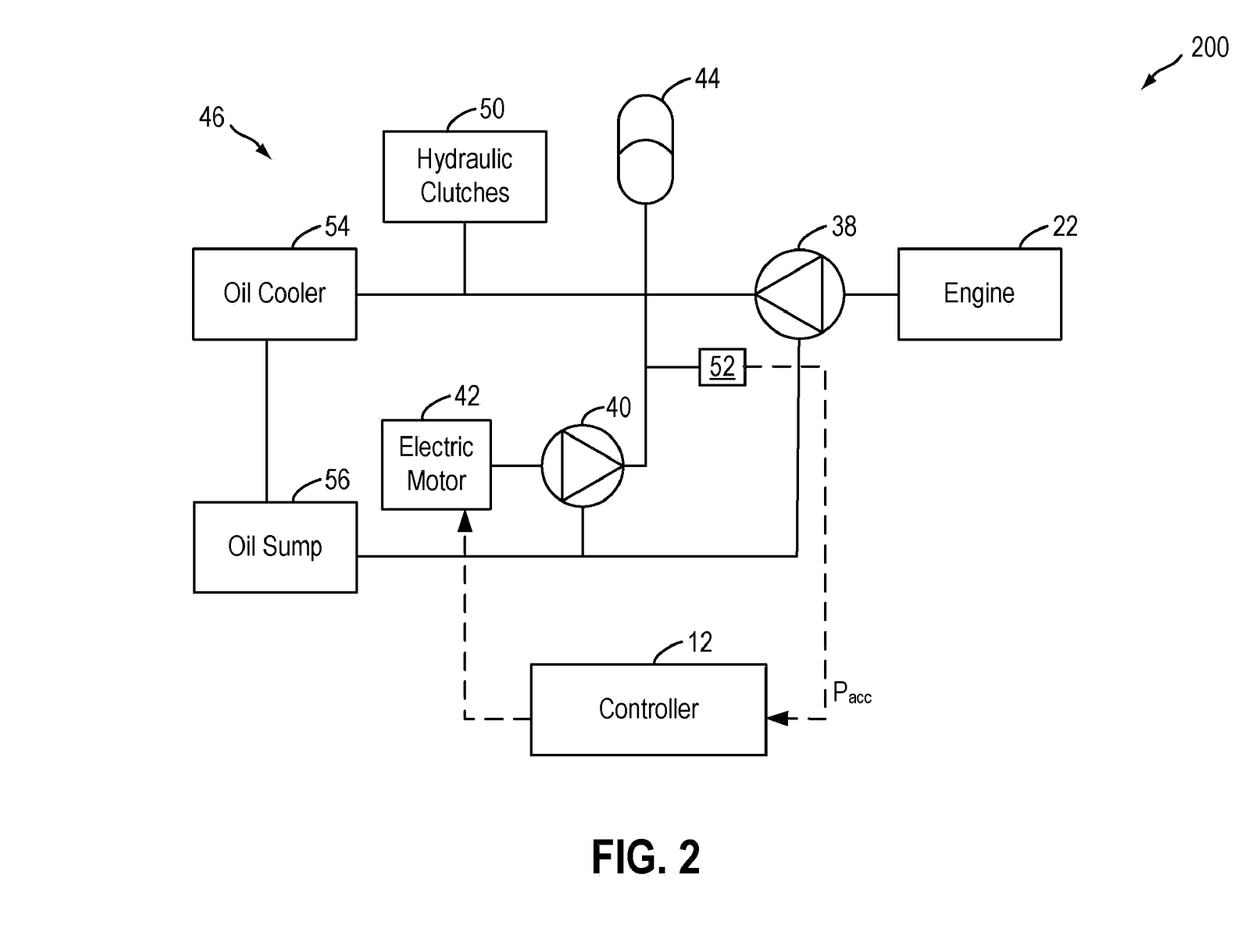
FIG. 2 shows an example embodiment of the hydraulic circuit of FIG. 1.
Figure 4:
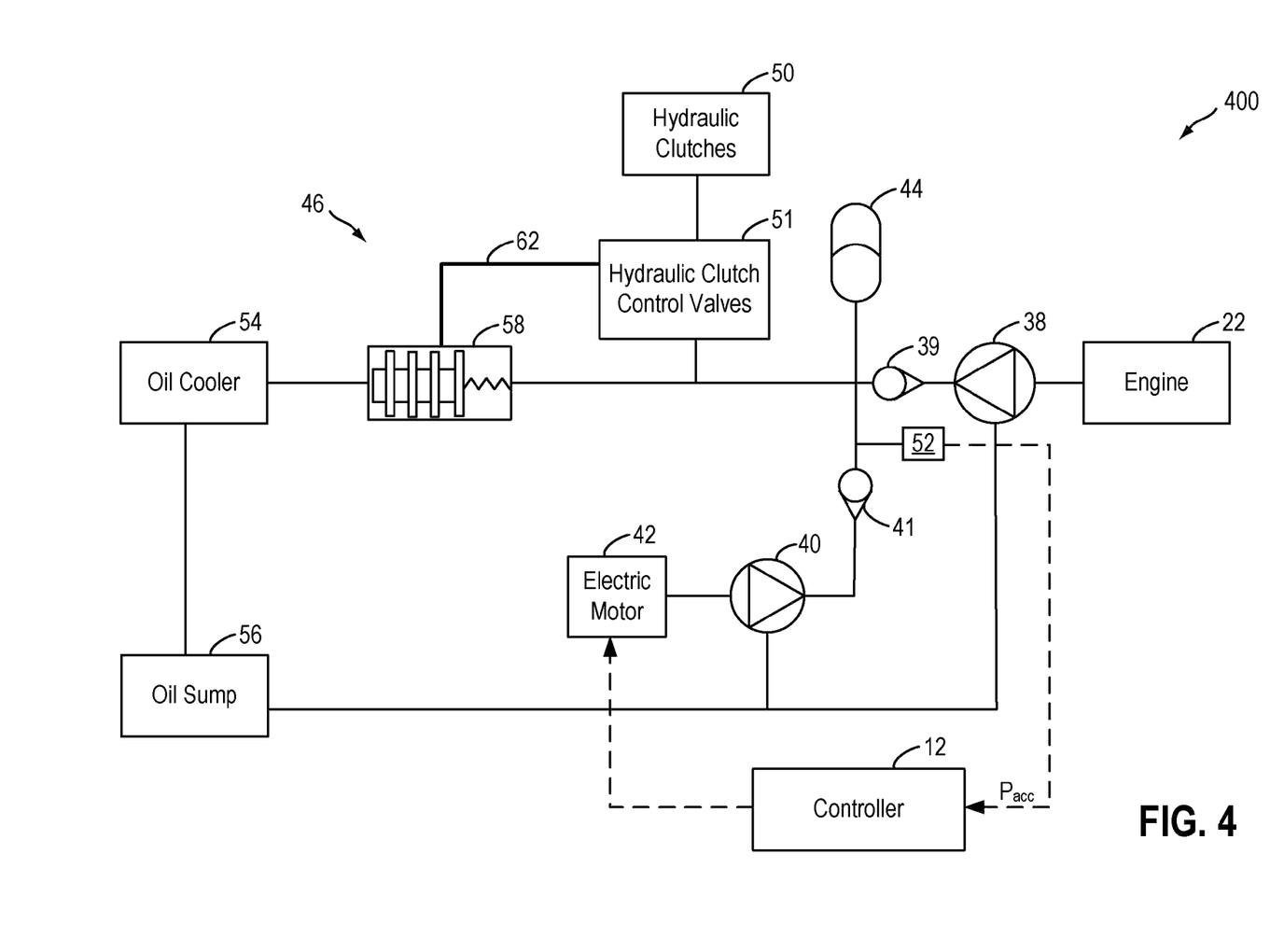
Figure 5:
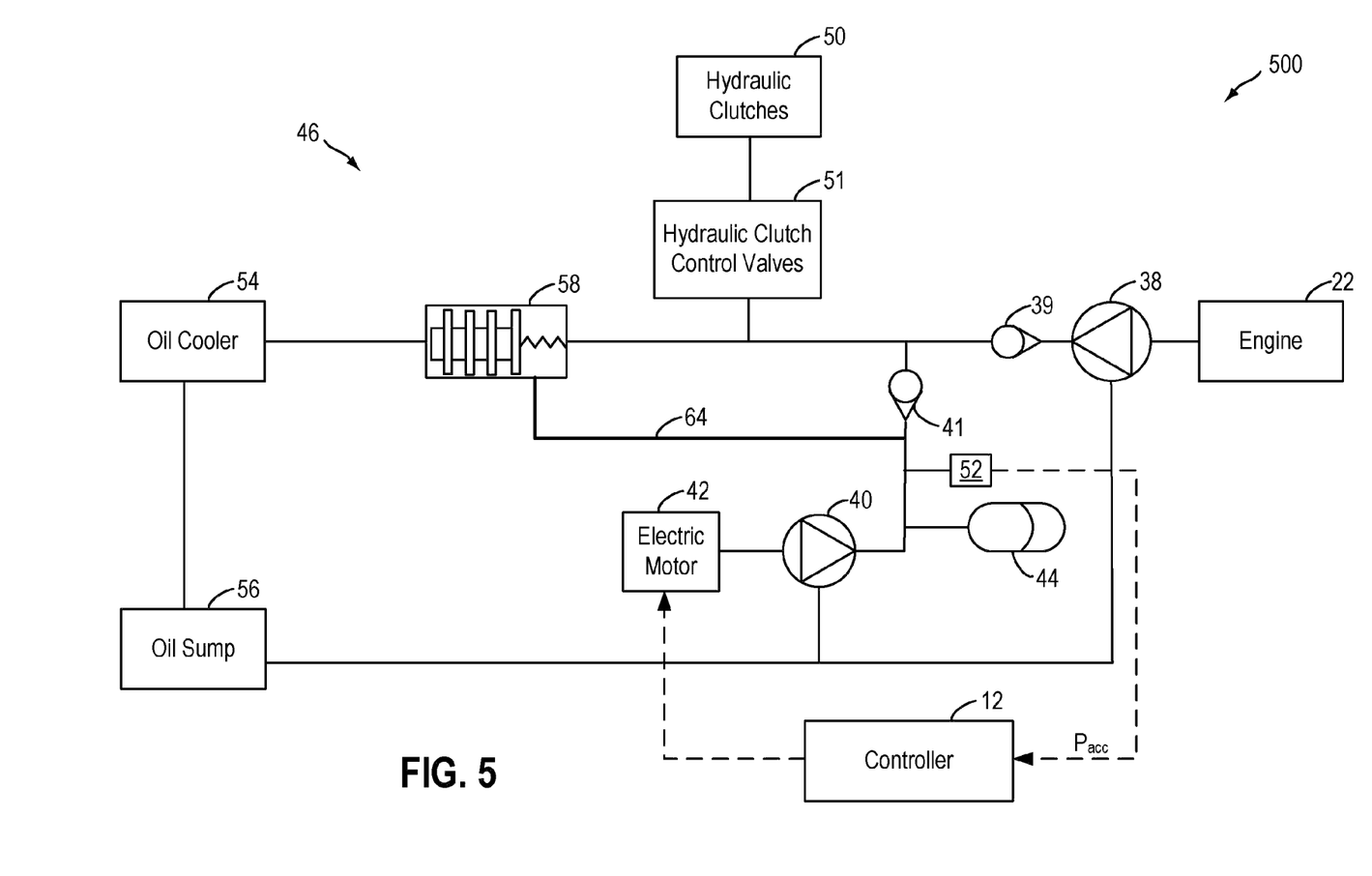
Figure 6:
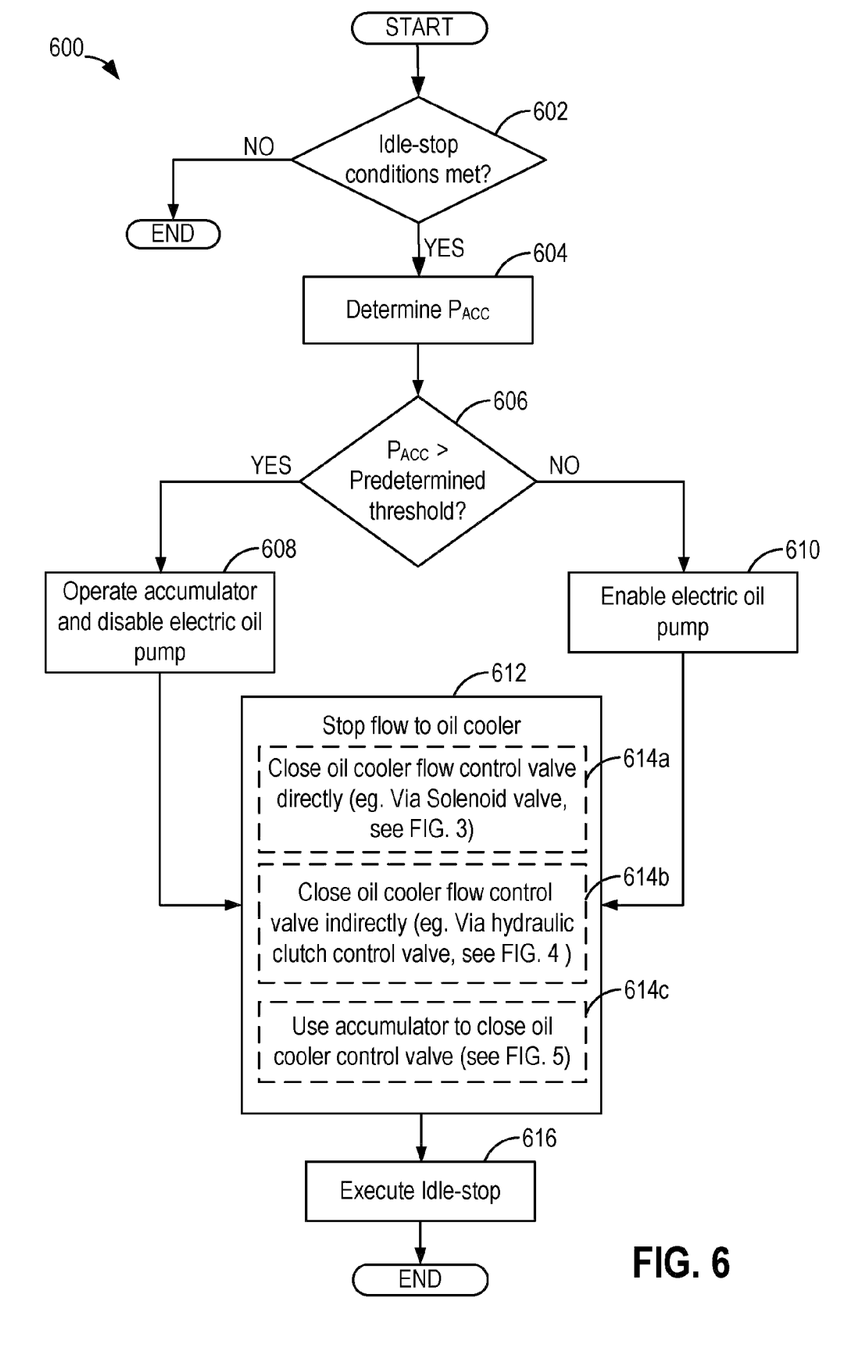
FIG. 6 shows a high level flow chart for executing an idle-stop operation according to the present disclosure.

The following description relates to systems and methods for performing an engine shut-down operation responsive to idle-stop conditions, wherein usage of an auxiliary pump in the maintenance of hydraulic line pressure prior to engine restart is minimized. As shown in FIGS. 1-2, a vehicle system may be configured with an electrically-operated auxiliary pump and an accumulator for delivering pressurized transmission fluid to transmission components, during an engine shutdown. Further, a pressure sensor may also be included to facilitate a pressure feedback-based control. As shown in FIG. 6, by adjusting the operation of the auxiliary pump responsive to the accumulator pressure, the auxiliary pump may be selectively operated to deliver at least some pressurized transmission fluid through the hydraulic line, without travelling through the accumulator, during the engine shutdown. In this way, the usage frequency and energy consumption of the auxiliary pump may be substantially reduced. As shown in FIGS. 3-6, flow of transmission fluid to sections of the hydraulic circuit not directly involved in an engine restart, such as an oil cooler, may be stopped. In doing so, the energy demands of the auxiliary pump and/or accumulator may be minimized. An engine control system may be configured to select between delivering pressurized transmission fluid to the hydraulic circuit from either the accumulator or the auxiliary pump based on the accumulator pressure. Further, in either condition, flow of transmission fluid through the oil cooler may be stopped by closing the oil cooler's flow control valve (FIG. 6). In this way, hydraulic pressure may be maintained during an engine shut-down to enable a rapid engagement of clutches during a subsequent engine restart. Further, the frequency with which the auxiliary pump is operated may be reduced. By reducing the operation time of the auxiliary pump, component damage from prolonged use may be reduced while also providing fuel savings. In this way, the quality of engine restarts may be improved.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate torque via torque actuator 24, such as a fuel injector, throttle, etc. Engine 22 may also include an auxiliary starter system (not shown) to support engine restart at near zero engine speed, for example at 50 RPM.

An engine output torque may be transmitted to torque converter 26 to drive an automatic transmission 28 by engaging one or more hydraulically actuated transmission components, or clutches, including one or more forward clutch(es) 30. As such, a plurality of such hydraulically actuated transmission components or clutches may be engaged, as needed. The output of the torque converter may, in turn, be controlled by torque converter lock-up clutch 32. As such, when torque converter lock-up clutch 32 is fully disengaged, no torque may be transmitted from torque converter 26 to automatic transmission 28. In contrast, when torque converter lock-up clutch 32 is fully engaged, the entire engine output torque may be relayed to an input shaft (not shown) of transmission 28. Alternatively, the torque converter lock-up clutch 32 may be partially engaged, thereby enabling the amount of torque relayed to the transmission to be adjusted.

Torque output from the automatic transmission 28 may in turn be relayed to wheels 34 to propel the vehicle. Specifically, automatic transmission 28 may adjust an input driving force along the input shaft (not shown) responsive to a vehicle traveling condition before transmitting an output driving force to the wheels. As such, wheels 34 may be locked by engaging wheel brakes 36. In one example, wheel brakes 36 may be engaged in response to the operator pressing his foot on a brake pedal (not shown). In the same way, wheels 34 may be unlocked by disengaging wheel brakes 36 in response to the operator releasing his foot from the brake pedal.

A mechanical oil pump 38 may be connected to the automatic transmission to provide hydraulic pressure to engage forward clutch 30. Mechanical oil pump 38 may be operated in accordance with torque converter 26, and may be driven by engine 22. Consequently, mechanical oil pump 38 may be inoperative during an engine shutdown event.

An auxiliary pump, operating independent from the driving force of the engine 22, may also be provided. In one example, the auxiliary pump may be electrically-operated. Specifically, during an engine shut-down, when the mechanical oil pump is inoperative, electric oil pump 40 may be operated to generate and maintain hydraulic pressure in the transmission fluid. By maintaining hydraulic pressure, a swift re-engagement of clutches may be enabled in response to a vehicle restart and re-launch request. Electric oil pump 40 may be driven by a motor (not shown) to which an electric power may be supplied, for example by a battery (not shown). Accumulator 44 may also be provided to generate and maintain hydraulic pressure in the transmission fluid during engine shut-down. As such, a transmission hydraulic circuit 46, (as further elaborated with reference to FIGS. 2-5) may be formed by the mechanical oil pump, the electric oil pump, the accumulator, and the hydraulically actuated transmission components.

During an engine shutdown procedure, in response to idle-stop conditions (such as, a shutdown request from the operator, battery state of charge falling below a threshold, etc.), controller 12 may be configured to determine an accumulator pressure and accordingly adjust delivery of pressurized transmission fluid into the transmission hydraulic circuit from either the accumulator or the auxiliary pump. Specifically, controller 12 may adjust the operation of the electric oil pump 40 responsive to the accumulator pressure. In one example, when the accumulator pressure is above a threshold, the electric oil pump may be disabled and the accumulator may be operated to deliver pressurized transmission fluid through the transmission components. In another example, when the accumulator pressure falls below the threshold, the electric oil pump may be operated to generate pressurized transmission fluid and at least some pressurized transmission fluid may be delivered to transmission components from the operating pump without travelling through the accumulator. In this way, hydraulic pressure may be maintained in the transmission during the shutdown, enabling a rapid re-engagement of transmission clutches when a vehicle restart and/or launch is subsequently requested.

Controller 12 may also be configured to receive inputs from engine 22 and accordingly control a torque output of the engine. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Figure 3:
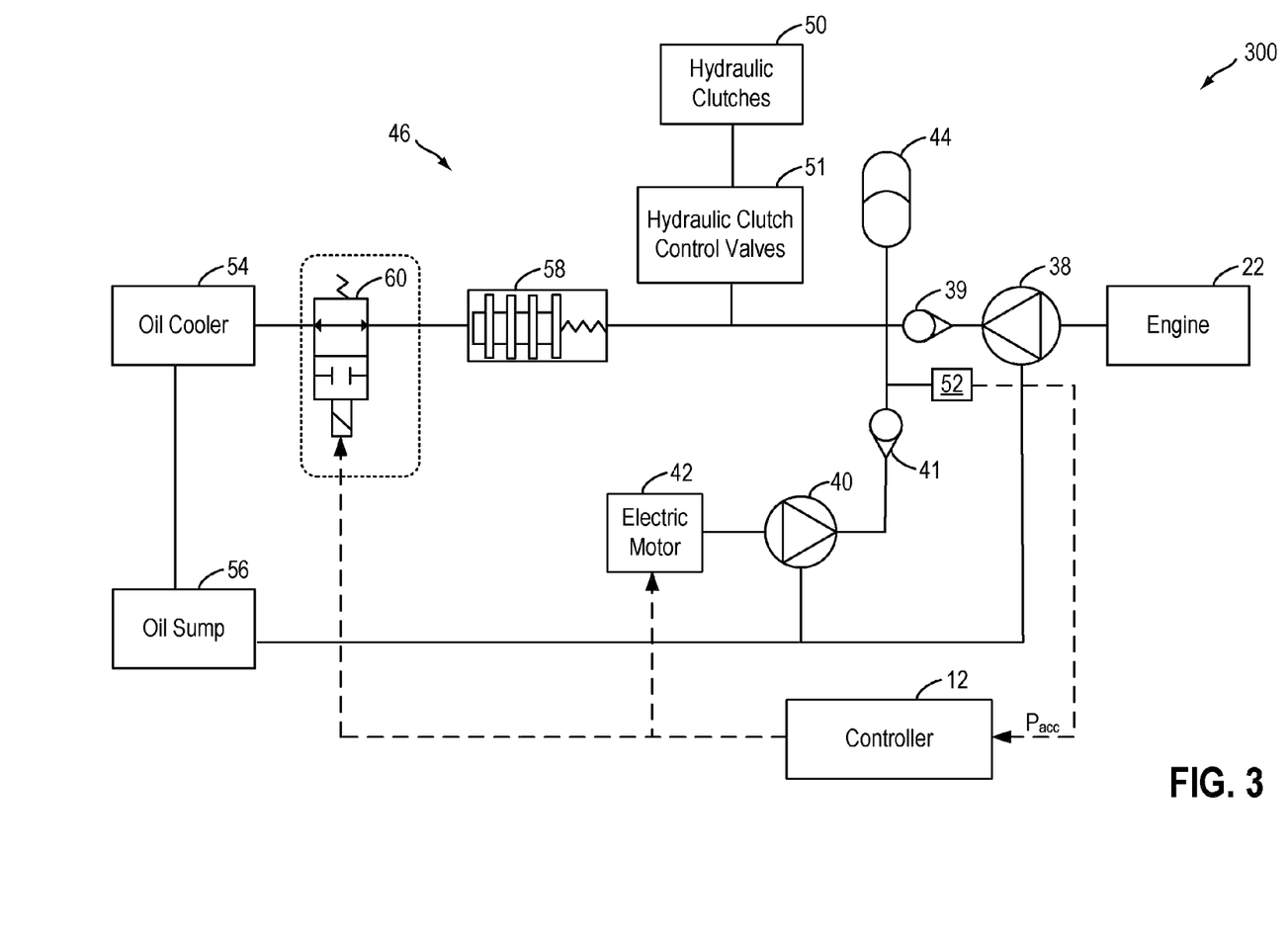
FIGS. 3-5 show alternate detailed embodiments of the hydraulic circuit of FIG. 2 according to the present disclosure.

FIG. 2 shows a simplified embodiment 200 of the hydraulic circuit 46 of FIG. 1. FIGS. 3-5 then depict detailed alternate embodiments of the hydraulic circuit of FIG. 2. It will be appreciated that components introduced in FIG. 2 may be similarly numbered in FIGS. 3-5, and may not be reintroduced for reasons of brevity.

Returning to FIG. 2, hydraulic circuit 46 includes mechanical oil pump 38, operated in concert with engine 22, and auxiliary electric oil pump 40, operated by electric motor 42. Pumps 38 and 40 may pump transmission fluid from oil sump 56 and deliver pressurized fluid into hydraulic circuit 46. Oil sump 56 provides the fluid reservoir to the electric pump 40 and the engine driven mechanical pump 38.

The pressurized fluid may be delivered to one or more hydraulically actuated transmission components, or hydraulic clutches 50. Accordingly, one or more of the hydraulic clutches 50 may be maintained in a stroked, partially engaged or fully engaged state. By maintaining hydraulic pressure in the transmission clutches during an engine shutdown, a rapid re-engagement of clutches may be enabled in response to a request for vehicle restart and/or launch. Alternatively, pressurized transmission fluid may be delivered into the hydraulic circuit by accumulator 44. Prior to an engine restart, accumulator 44 may be discharged to generate the desired hydraulic line pressure. Then, following engine restart, or possibly even during a restart, once mechanical oil pump 38 is operative, it may be used to recharge accumulator 44.

Pressure sensor 52 may provide an estimate of the pressure ($P_{acc}$) inside accumulator 44. As further detailed in FIG. 6, controller 12 may be configured to adjust the operation of the electric oil pump 40 responsive to $P_{acc}$.

Hydraulic circuit 46 may also include one or more secondary components, that is, components not immediately involved in engine restart procedures. In one example, as illustrated, the secondary component is an oil cooler 54. However, other secondary components may alternatively or additionally be included, such as the torque converter, other clutches (not involved in engine shut-down and re-start), and associated clutch control solenoids. Oil cooler 54 may be configured to cool transmission fluid that is pumped therethrough. By lowering the temperature of the fluid, the viscosity of the transmission fluid may be increased. The increased viscosity may reduce the amount of fluid leakage that occurs in the system. In one example, oil cooler 54 may be cooled via air flow.

A variety of check valves (not shown), may be used to provide proper fluid flow. For example, check valves may be coupled to the outlet of the mechanical and electric oil pumps to prevent backflow. Additionally, flow control valves may be coupled to the hydraulic clutches and/or the oil cooler to regulate the flow of pressurized fluid through those sections of the hydraulic circuit. As further elaborated with reference to FIGS. 3-6, flow of pressurized transmission fluid into the oil cooler may be reduced or stopped under selected engine idle-stop conditions, by regulating the flow through an oil cooler flow control valve. By reducing flow through the oil cooler section of the hydraulic circuit, the power demands on the electric oil pump may be reduced during an engine shutdown, thereby increasing the operative life of the electric pump and also providing fuel savings.

FIG. 3 shows a first detailed embodiment 300 of the hydraulic circuit 46 of FIG. 2. Herein, check valve 39 is coupled to the outlet of mechanical oil pump 38 to prevent backflow there-through. Similarly, check valve 41 is coupled to the outlet of auxiliary electric oil pump 40 to prevent backflow there-through. Pressure sensor 52 is positioned substantially between check valves 39 and 41 to provide an estimate of the accumulator pressure ($P_{acc}$) to controller 12.

Flow of transmission fluid through the one or more hydraulically actuated transmission components, or hydraulic clutches 50, may be controlled by respective hydraulic clutch control valves 51. As such, even when closed, some amount of fluid may leak through the hydraulic clutch control valves 51 and accordingly any pressure difference caused by the leakage may need to be compensated by the accumulator 44 and/or the electric oil pump 40.

Flow of transmission fluid through oil cooler 54 may be controlled by oil cooler flow control valve 58. During an engine shutdown, controller 12 may be configured to shut-off flow through the oil cooler by closing oil cooler flow control valve 58 in an assisted or unassisted manner. For example, the flow from oil cooler control valve 58 to the oil cooler 54 can be optionally controlled using one or more actively controlled valves, such as electrically controlled solenoid valve 60.

In one example, oil cooler flow control valve 58 may be spring-loaded. Herein, closing the oil cooler flow control valve may include adjusting the threshold pressure to enable the oil cooler flow control valve to close unassisted. Specifically, a controller may set the threshold pressure (for example, the maximum pressure in the accumulator) to a low enough value to enable the pressurized transmission fluid to exert a force on the oil cooler flow control valve's return spring, the spring thereby pushing the valve's spool to a closed (or end) position. As such, this closes flow of transmission fluid from the hydraulic circuit into the oil cooler flow control valve and thence on to the oil cooler 54. It will be appreciated that, to enable the oil cooler flow control valve 58 to close unassisted, the threshold pressure may have to be sufficient enough to overcome pressure losses due to flow leakage through the hydraulic clutch control valves 51.

In another example, the oil cooler flow control valve may include an optional solenoid valve 60. Herein, closing the oil cooler flow control valve may include, activating or, deactivating, (depending on the solenoid valve configuration) and thereby closing, the solenoid valve 60. In this way, the solenoid valve 60 may assist in the closing of the oil cooler flow control valve. As such, use of the optional solenoid valve may be preferred when a higher line pressure is required to maintain flow to the hydraulic clutches 50 through the hydraulic clutch control valves 51.

FIG. 4 shows a second detailed embodiment 400 of the hydraulic circuit 46 of FIG. 2. Herein, a valve closure line 62 may be included to enable an assisted closure of the oil cooler flow control valve 58. Specifically, valve closure line 62 may connect oil cooler flow control valve 58 with hydraulic clutch control valves 51. Herein, closing the oil cooler flow control valve includes adjusting (e.g., opening, or closing, depending on the valve configuration) the hydraulic clutch control valve 51 to generate hydraulic pressure in valve closure line 62, the generated hydraulic pressure enabling closure of the oil cooler flow control valve 58. Specifically, during an engine shutdown, controller 12 may command a hydraulic clutch control valve 51 corresponding to a hydraulic clutch 50 that is not immediately involved in an engine restart, such as a reverse gear clutch control valve associated with a reverse gear clutch, to pressurize a land in the oil cooler flow control valve 58 by transferring flow along the valve closure line 62.

As such, this may assist in the closure of the oil cooler flow control valve 58 and allow flow to the oil cooler 54 to be stopped.

FIG. 5 shows a third detailed embodiment 500 of the hydraulic circuit 46 of FIG. 2. Herein, the accumulator may be positioned between the outlet of the auxiliary electric oil pump 40 and the auxiliary pump check valve 41. Furthermore, an alternate valve closure line 64 may be included to connect the oil cooler flow control valve 58 directly with the output of accumulator 44, at a point substantially between accumulator 44 and check valve 41. Herein, closing the oil cooler flow control valve includes operating the accumulator to generate hydraulic pressure to close the oil cooler flow control valve. Specifically, during an engine shutdown, controller 12 may operate accumulator 44 and deliver pressurized fluid on a land in the oil cooler flow control valve 58 along the valve closure line 64. As such, this may assist in the closure of the oil cooler flow control valve 58 and allow flow to the oil cooler 54 to be stopped.

It will be appreciated that additional flow restriction valves (not shown) may be included in the hydraulic circuit of FIGS. 2-5 to minimize flow to the oil cooler and other sections of the hydraulic circuit that are not required to support an engine shutdown or restart. Such valves may reduce flow leakage from the clutch pressure control valves and spool valves while also reducing the flow and pressure requirements of the hydraulic circuit.

FIG. 6 depicts a routine 600 for performing an idle-stop operation in the vehicle system of FIG. 1. At 602, it is confirmed if idle-stop conditions have been met. These may include, for example, the battery state of charge being more than a threshold, the vehicle running speed being within a desired range, no request for air conditioning, engine temperature being above a predetermined threshold, vehicle stop request from operator, etc. If idle-stop conditions are not met, the routine may end. However, if any or all of the idle-stop conditions are met, then at 604, the accumulator pressure ($P_{acc}$) may be estimated. In one example, pressure sensor 52 may provide an estimate of $P_{acc}$.

At 606, it may be determined whether $P_{acc}$ is above a predetermined threshold pressure. If $P_{acc}$ is above the threshold pressure, then at 608, pressurized transmission fluid may be delivered to the hydraulic circuit of the vehicle from the accumulator, while disabling the electric oil pump. In contrast, if $P_{acc}$ is below the threshold, then at 610, the electric pump may be enabled and at least some pressurized transmission fluid may be delivered to the hydraulic circuit from the operating pump, without travelling through the accumulator.

At 612, flow of transmission fluid through the oil cooler may be reduced, stopped for example, by closing the oil cooler flow control valve. In one example, at 614*a*, the oil cooler flow control valve may be closed with the assistance of an electrically controlled solenoid valve arranged in series with the oil cooler flow control valve. As previously elaborated in FIG. 3, a controller may be configured to activate or deactivate (depending on the valve configuration) and thereby close the solenoid valve, thereby closing the oil cooler flow control valve. Alternatively, the controller may adjust the threshold pressure to enable pressurized transmission fluid to exert force on valve's spool return spring, the spring thereby pushing the spool of the oil cooler flow control valve to an end position. As such, this enables the oil cooler flow control valve to close unassisted.

In another example, at 614*b*, the oil cooler flow control valve may be closed with the assistance of a hydraulic clutch control valve communicating with oil cooler flow control valve along a valve closure line. As previously elaborated in FIG. 4, a controller may command a hydraulic clutch control valve of a hydraulic clutch not immediately involved in an engine restart, such as the reverse gear clutch control valve of a reverse gear clutch, to pressurize a land in the oil cooler flow control valve by transferring pressurized transmission fluid along a valve closure line. As such, this enables the oil cooler flow control valve to close with assistance.

In yet another example, at 614*c*, the oil cooler flow control valve may be closed by applying pressure directly from an accumulator. As previously elaborated in FIG. 5, a controller may apply pressure from the accumulator on a land in the oil cooler flow control valve by transferring transmission fluid along a valve closure line. As such, this enables the oil cooler flow control valve to close.

While the described examples discuss flow stoppage through the oil cooler, it will be appreciated that in alternate embodiments, flow through one or more secondary components not directly involved in engine shutdown or restart, may be stopped.

Figure 7:
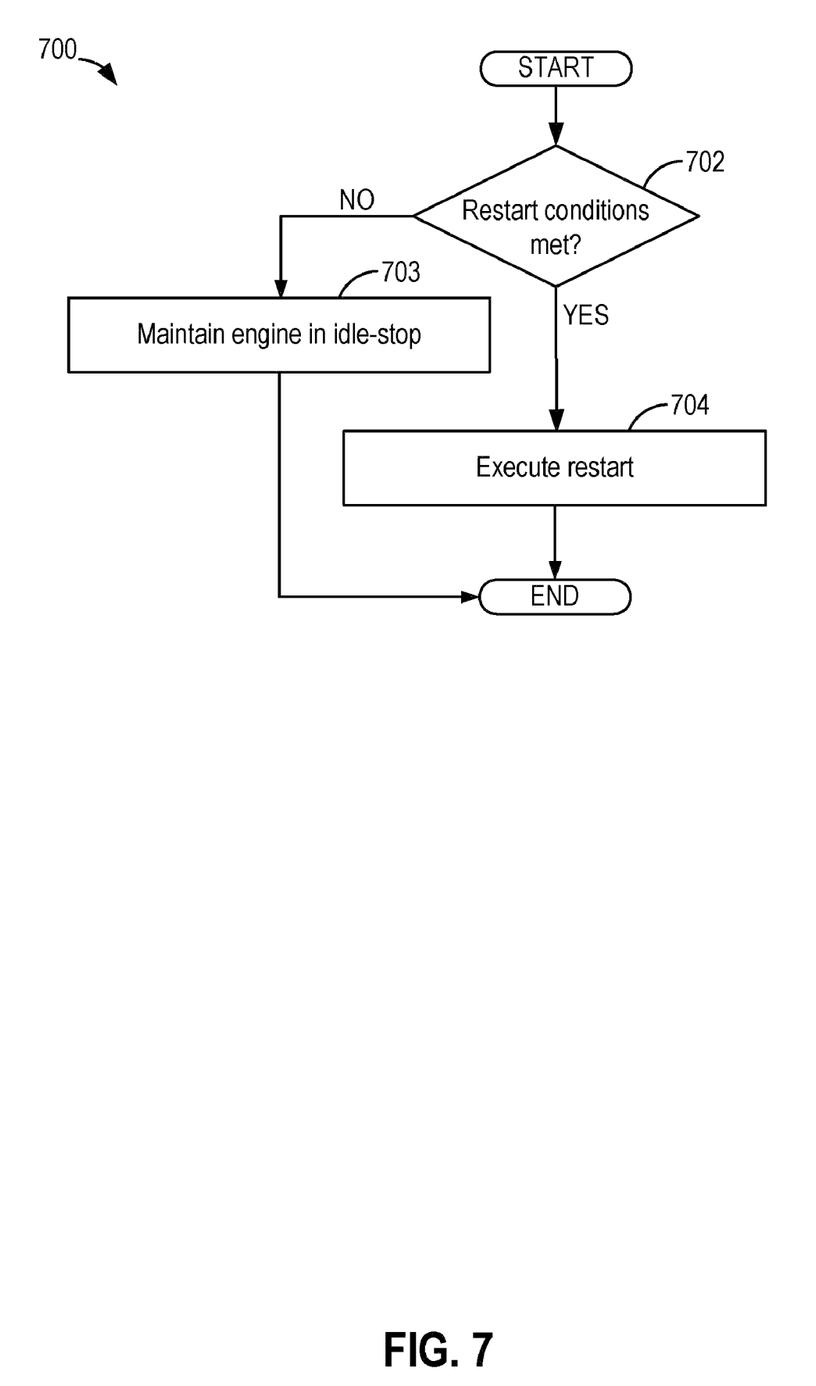
FIG. 7 shows a high level flow chart for executing a restart operation.

FIG. 7 depicts a routine 700 for performing a restart operation following an engine idle-stop in the vehicle system of FIG. 1. At 702, it is confirmed if restart conditions have been met. These may include, for example, the battery state of charge being less than a threshold, the a request for air conditioning, engine temperature being below a predetermined threshold, a vehicle restart and/or launch request from operator, etc. If restart conditions are not met, then at 703, the engine may be maintained at idle-stop. However, if any or all of the restart conditions are met, then at 704, an engine restart may be executed.

In one example, during the idle-stop preceding the restart, hydraulic line pressure may be delivered by the system accumulator. In this case, during the engine restart, a controller may command the accumulator to be discharged to enable a swift engagement of transmission components (such as a forward clutch) and a rapid vehicle launch. In another example, during the idle-stop preceding the restart, hydraulic line pressure may be delivered by an auxiliary pump, such as an electric oil pump. In this case, during the engine restart, the controller may command the electric oil pump to maintain hydraulic line pressure and enable the transmission components to be engaged. Then, once the engine speed has increased and the output of the mechanical oil pump has increased sufficiently to maintain engagement of the transmission components, the electric oil pump may be disabled.

In this way, based on accumulator pressure, hydraulic line pressure may be delivered to transmission components during an engine shutdown by either an accumulator or an auxiliary electric pump. By operating the pump to deliver pressurized transmission fluid to the hydraulic circuit (and not the accumulator) only under conditions where pressurized fluid may not be delivered by the accumulator, the usage of the electric oil pump may be minimized. By minimizing electric oil pump usage, the operating life of the pump may be increased and substantial fuel savings may be attained. Additionally, during the engine shutdown, when pressurized fluid is delivered either by the accumulator or the electric oil pump, flow may be stopped to components not directly involved in engine restart. By minimizing flow to sections of the transmission hydraulic circuit not involved in engine restart, the pressure and energy demands of the electric oil pump may be further reduced, thereby providing additional fuel savings.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle system including an engine that is selectively shut-down during engine idle-stop conditions, the system further including a hydraulic circuit comprising a hydraulically actuated transmission component, an accumulator, and an auxiliary transmission fluid pump, the method comprising:
    during a first idle-stop engine shut-down condition, where accumulator pressure is above a threshold pressure, delivering pressurized transmission fluid to the hydraulic circuit from the accumulator, while disabling the auxiliary pump; and
    during a second idle-stop engine shut-down condition, where the accumulator pressure is below the threshold pressure, operating the auxiliary pump and delivering at least some pressurized transmission fluid to the hydraulic circuit from the operating pump without travelling through the accumulator.

2. The method of claim 1, wherein the hydraulic circuit further includes a secondary component, the method further comprising, during the first or second idle-stop engine shut-down condition, reducing flow of transmission fluid through the secondary component.

3. The method of claim 2, wherein the auxiliary pump is electrically-operated, and further wherein the secondary component is an oil cooler.

4. The method of claim 3, wherein flow of transmission fluid through the oil cooler is controlled by an oil cooler flow control valve, and further wherein reducing flow through the oil cooler includes closing the oil cooler flow control valve and stopping flow through the oil cooler.

5. The method of claim 4, wherein the oil cooler flow control valve is spring-loaded, and further wherein closing the oil cooler flow control valve includes adjusting the threshold pressure to enable the pressurized transmission fluid to exert force on the valve's spring, the spring pushing the valve's spool to a closed position.

6. The method of claim 4 wherein the oil cooler flow control valve includes a solenoid valve, and further wherein closing the oil cooler flow control valve includes, activating or, deactivating the solenoid.

7. The method of claim 4, wherein flow of transmission fluid through the hydraulically actuated transmission component is controlled by a clutch control valve, the clutch control valve connected to the oil cooler flow control valve by a valve closure line, and further wherein closing the oil cooler flow control valve includes adjusting the clutch control valve to generate hydraulic pressure in the valve closure line, the generated hydraulic pressure enabling closure of the oil cooler flow control valve.

8. The method of claim 7, wherein the hydraulically actuated transmission component is a reverse gear clutch, and the clutch control valve is a reverse gear clutch control valve.

9. A method of controlling a vehicle system including an engine that is selectively shut-down during engine idle-stop conditions, the system further including a hydraulic circuit comprising a hydraulically actuated transmission component, an accumulator, an electrically-operated auxiliary transmission fluid pump, and an oil cooler, the method comprising:
    during a first idle-stop engine shut-down condition, where accumulator pressure is above a threshold pressure, delivering pressurized transmission fluid to the hydraulic circuit from the accumulator, while disabling the auxiliary pump;
    during a second idle-stop engine shut-down condition, where the accumulator pressure is below the threshold pressure, operating the auxiliary pump and delivering at least some pressurized transmission fluid to the hydraulic circuit from the operating pump without travelling through the accumulator; and
    during either the first or second idle-stop engine shut-down condition, reducing flow of transmission fluid through the oil cooler.

10. The method of claim 9, wherein the flow of transmission fluid through the oil cooler is controlled by an oil cooler flow control valve, and further wherein reducing flow of transmission fluid through the oil cooler includes closing the oil cooler flow control valve.

11. The method of claim 10, wherein the oil cooler flow control valve is spring-loaded, and further wherein closing the oil cooler flow control valve includes adjusting the threshold pressure to enable the pressurized transmission fluid to exert force on the valve's spring, the spring pushing the valve's spool to a closed position.

12. The method of claim 10, wherein the oil cooler flow control valve is a solenoid valve, and further wherein closing the oil cooler flow control valve includes, activating or, deactivating the solenoid.

13. The method of claim 10, wherein flow of transmission fluid through the hydraulically actuated transmission component is controlled by a clutch control valve, the clutch control valve connected to the oil cooler flow control valve by a valve closure line, and further wherein closing the oil cooler flow control valve includes adjusting the clutch control valve to generate hydraulic pressure in the valve closure line, the generated hydraulic pressure enabling closure of the oil cooler flow control valve.

14. The method of claim 13, wherein the hydraulically actuated transmission component is a reverse gear clutch, and the clutch control valve is a reverse gear clutch control valve.

15. The method of claim 10, wherein the hydraulic circuit further includes an auxiliary pump check valve, the auxiliary pump check valve coupled to the outlet of the auxiliary pump, the accumulator positioned between the auxiliary pump outlet and the auxiliary pump check valve, and further wherein closing the oil cooler flow control valve includes operating the accumulator to generate hydraulic pressure to close the oil cooler flow control valve.

16. A vehicle system, comprising:
an engine;
a hydraulic circuit including,
    a mechanical pump;
    a mechanical pump check valve coupled to an outlet of the mechanical pump;
    an electrically-operated auxiliary pump;
    an auxiliary pump check valve coupled to an outlet of the auxiliary pump;
    an accumulator;
    a pressure sensor positioned substantially between the mechanical pump and the auxiliary pump;
    an oil cooler, flow of transmission fluid through the oil cooler controlled by an oil cooler flow control valve; and
    a hydraulically actuated transmission component, flow of transmission fluid through the hydraulically actuated transmission component controlled by a clutch control valve; and
a control system configured to:
    selectively shut-down the engine during engine idle-stop conditions; and
    during a first idle-stop engine shut-down condition, where accumulator pressure is above a threshold pressure, deliver pressurized transmission fluid to the hydraulic circuit from the accumulator, while disabling the auxiliary pump;
    during a second idle-stop engine shut-down condition, where the accumulator pressure is below the threshold pressure, operate the auxiliary pump and deliver at least some pressurized transmission fluid to the hydraulic circuit from the operating pump without travelling through the accumulator; and
    during either the first or second idle-stop engine shut-down condition, reduce flow of transmission fluid through the oil cooler by closing the oil cooler flow control valve.

17. The vehicle system of claim 16, wherein the oil cooler flow control valve is spring-loaded, and wherein closing the oil cooler flow control valve includes adjusting the threshold pressure to enable the pressurized transmission fluid to exert force on the valve's spring, the spring pushing the valve's spool to a closed position.

18. The vehicle system of claim 16, wherein the oil cooler flow control valve is a solenoid valve, and wherein closing the oil cooler flow control valve includes, activating or, deactivating the solenoid.

19. The vehicle system of claim 16 wherein the hydraulically actuated transmission component is not immediately involved in an engine restart, wherein the clutch control valve is connected to the oil cooler flow control valve by a valve closure line, and further wherein closing the oil cooler flow control valve includes adjusting the clutch control valve to generate hydraulic pressure in the valve closure line, the generated hydraulic pressure enabling closure of the oil cooler flow control valve.

20. The vehicle system of claim 16 wherein the accumulator is positioned between the outlet of the auxiliary pump and the auxiliary pump check valve, wherein the pressure sensor is positioned between the accumulator and the auxiliary pump check valve, and further wherein closing the oil cooler flow control valve includes operating the accumulator to generate hydraulic pressure to close the oil cooler flow control valve.

* * * * *